US 8,286,139 B2

(12) United States Patent
Jones et al.

(10) Patent No.: US 8,286,139 B2
(45) Date of Patent: Oct. 9, 2012

(54) CALL STACK SAMPLING FOR THREADS HAVING LATENCIES EXCEEDING A THRESHOLD

(75) Inventors: Scott Thomas Jones, Austin, TX (US); Frank Eliot Levine, Austin, TX (US)

(73) Assignee: International Businesss Machines Corporation, Armonk, NY (US)

( * ) Notice: Subject to any disclaimer, the term of this patent is extended or adjusted under 35 U.S.C. 154(b) by 1239 days.

(21) Appl. No.: 12/051,265

(22) Filed: Mar. 19, 2008

(65) Prior Publication Data

US 2009/0241095 A1 Sep. 24, 2009

(51) Int. Cl.
*G06F 9/44* (2006.01)
*G06F 9/46* (2006.01)

(52) U.S. Cl. ........ 717/128; 717/127; 717/130; 717/131; 717/132; 718/104

(58) Field of Classification Search .................. None
See application file for complete search history.

(56) References Cited

U.S. PATENT DOCUMENTS

| | | | | |
|---|---|---|---|---|
| 5,826,081 A * | 10/1998 | Zolnowsky | ................... | 718/103 |
| 6,256,775 B1 * | 7/2001 | Flynn | ............................ | 717/127 |
| 6,513,155 B1 | 1/2003 | Alexander, III et al. | | |
| 6,539,339 B1 * | 3/2003 | Berry et al. | ................... | 702/186 |
| 6,651,243 B1 * | 11/2003 | Berry et al. | ................... | 717/130 |
| 6,662,358 B1 * | 12/2003 | Berry et al. | ................... | 717/128 |
| 6,735,758 B1 * | 5/2004 | Berry et al. | ................... | 717/130 |
| 6,857,120 B1 * | 2/2005 | Arnold et al. | .................. | 717/157 |
| 6,961,930 B1 | 11/2005 | Waldspurger et al. | | |
| 7,082,599 B1 * | 7/2006 | Morganelli et al. | ........... | 717/132 |
| 7,412,694 B2 * | 8/2008 | Fink et al. | ...................... | 717/128 |
| 7,607,122 B2 * | 10/2009 | Hatlelid et al. | ................ | 717/127 |
| 7,962,924 B2 * | 6/2011 | Kuiper et al. | ................... | 719/321 |
| 8,185,906 B2 * | 5/2012 | Muscarella | ................... | 718/104 |
| 2003/0056200 A1 * | 3/2003 | Li et al. | .......................... | 717/128 |
| 2004/0117796 A1 * | 6/2004 | Dichter | .......................... | 718/107 |
| 2005/0071516 A1 * | 3/2005 | Levine et al. | ..................... | 710/1 |
| 2005/0071611 A1 * | 3/2005 | DeWitt et al. | .................. | 712/227 |
| 2005/0283765 A1 * | 12/2005 | Warren et al. | ................. | 717/131 |
| 2006/0059486 A1 | 3/2006 | Loh et al. | | |
| 2006/0092846 A1 * | 5/2006 | Loh et al. | ....................... | 370/241 |
| 2007/0220515 A1 | 9/2007 | Dewitt, Jr. et al. | | |
| 2008/0148240 A1 * | 6/2008 | Jones et al. | .................... | 717/130 |
| 2008/0307441 A1 * | 12/2008 | Kuiper et al. | .................. | 719/321 |

OTHER PUBLICATIONS

Robert J. Hall, "Aspect-capable Call Path Profiling of Multi-threaded Java Applications",[Online], 2002, pp. 1-10, [Retrieved from Internet on Jan. 3, 2012], <http://ase-conferences.org/olbib/01114999.pdf>.*
Erik Cota-Robels et al., "A Comparison of Windows Driver Model Latency Performance on Windows NT and Windows 98", [Online], 1999, pp. 1-15, [Retrieved on Jan. 3, 2012 from Internet], <http://www.usenix.org/events/osdi99/full_papers/cota/cota.pdf>.*

(Continued)

*Primary Examiner* — Thuy Dao
*Assistant Examiner* — Ziaul A Chowdhury
(74) *Attorney, Agent, or Firm* — Yee & Associates, P.C.; David A. Mims, Jr.

(57) ABSTRACT

A computer implemented method, apparatus, and computer usable program code for sampling call stack information. An accumulated latency time is monitored for a set of threads executing in a data processing system. The call stack information is obtained for the thread in response to a thread in the set of threads having an associated accumulated latency exceeding a threshold.

23 Claims, 5 Drawing Sheets

OTHER PUBLICATIONS

Wen-ke Chen et al., "Profile-guided Proactive Garbage Collection for Locality Optimization", [Online], 2006, pp. 1-10, [Retrieved from Internet on May 24, 2012], <http://citeseerx.ist.psu.edu/viewdoc/download?doi=10.1.1.93.5774&rep=rep1&type=pdf>.*

Aaron Brown et al., "Analyzing Application Performance Using a SystemMonitoring Database", [Online], 2003, pp. 1-38, [Retrieved from Internet on May 24, 2012], <http://www.eecs.berkeley.edu/Pubs/TechRpts/2003/CSD-03-1224.pdf>.*

John Reumann, "Model-Based System Management for Multi-Tiered Servers", [Online], 2003, pp. 1-211, [Retrieved from Internet on May 24, 2012], <http://kabru.eecs.umich.edu/papers/thesis/reumann_thesis.pdf>.*

Fabian E Bustamante, "The Active Streams Approach to Adaptive Distributed Applications and Services", [Online], 2002, pp. 1-112, [Retrived from Internet on May 24, 2012], <http://citeseerx.ist.psu.edu/viewdoc/download?doi=10.1.1.74.5213&rep=rep1&type=pdf>.*

* cited by examiner

CALL STACK SAMPLING FOR THREADS HAVING LATENCIES EXCEEDING A THRESHOLD

BACKGROUND OF THE INVENTION

1. Field of the Invention

The present disclosure relates generally to an improved data processing system and in particular to a method and apparatus for processing data. Still more particularly, the present disclosure relates to a computer implemented method, apparatus, and computer usable program code for call stack sampling in a data processing system.

2. Description of the Related Art

In writing code, runtime analysis of the code is often performed as part of an optimization process. Runtime analysis is used to understand the behavior of components or modules within the code using data collected during the execution of the code. The analysis of the data collected may provide insight to various potential misbehaviors in the code. For example, an understanding of execution paths, code coverage, memory utilization, memory errors and memory leaks in native applications, performance bottlenecks, and threading problems are examples of aspects that may be identified through analyzing the code during execution.

The performance characteristics of code may be identified using a software performance analysis tool. The identification of the different characteristics may be based on a trace facility of a trace system. A trace tool may use various techniques to provide information, such as execution flows, as well as other aspects of an executing program. A trace may contain data about the execution of code. For example, a trace may contain trace records about events generated during the execution of the code. A trace also may include information, such as a process identifier, a thread identifier, and a program counter. Information in the trace may vary depending on the particular profile or analysis that is to be performed. A record is a unit of information relating to an event that is detected during the execution of the code.

In obtaining trace data, it is a common practice to obtain information about executing threads. This information may include call stack information obtained from call stacks associated with the threads of interest. Call stack information may be obtained from a virtual machine, such as a Java™ virtual machine. Java™ is a trademark of Sun Microsystems, Inc. Many approaches are presently used for obtaining call stack information. These approaches include using entry/exit events, an application timer tick, or instrumenting codes that sample the instrumented values.

BRIEF SUMMARY OF THE INVENTION

The illustrative embodiments provide a computer implemented method, apparatus, and computer usable program code for sampling call stack information. An accumulated latency time is monitored for a set of threads executing in a data processing system. The call stack information is obtained for the thread in response to a thread in the set of threads having an associated accumulated latency exceeding a threshold.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
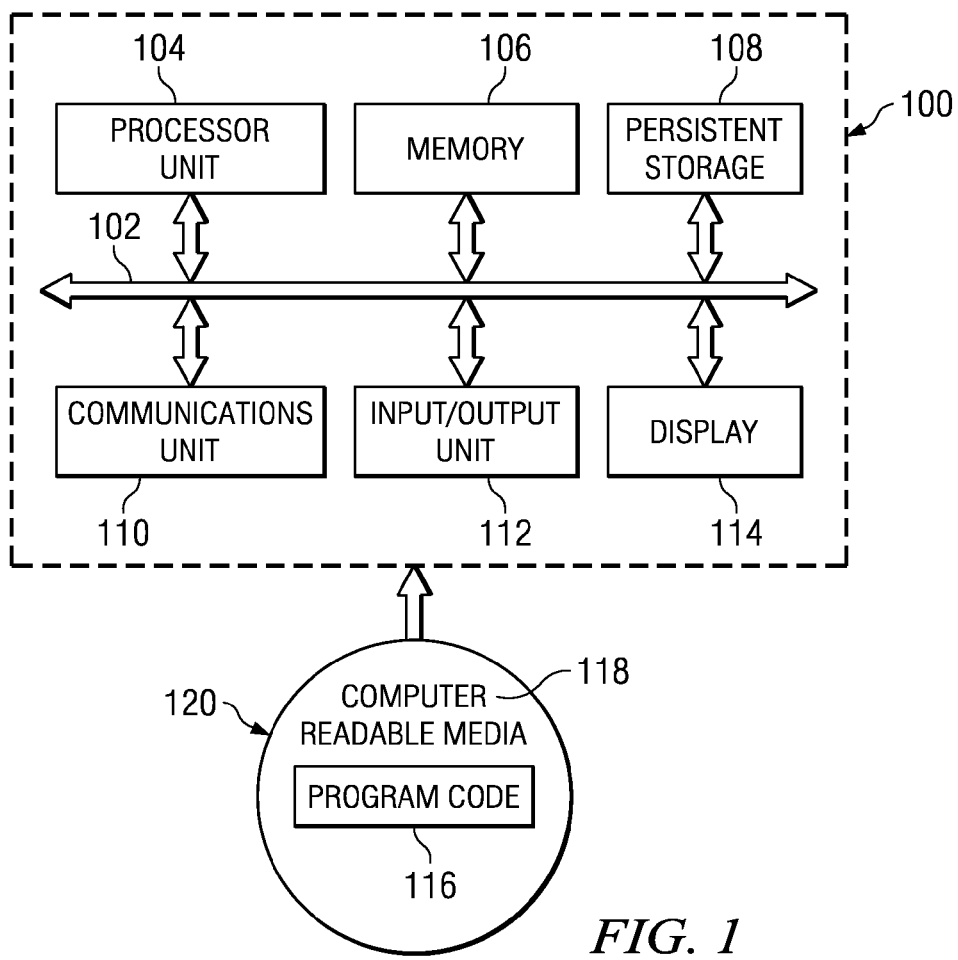
FIG. 1 is a diagram of a data processing system in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. In the illustrative embodiments, program code 116 may include instructions executed by data processing system 100 to perform call stack sampling. In particular, the different illustrative embodiments may perform call stack sampling for threads having latencies exceeding a threshold. Program code 116 and computer readable media 118 form computer program product 120 in these examples.

In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The different illustrative embodiments recognize that determining flows to where a latency occurs may provide some insight into the characteristics of an application or process. The illustrative embodiments recognize that different techniques may be used to obtain information about latency occurring during execution of a process or application. The different illustrative embodiments also recognize that one approach may obtain entry and exit events. Upon obtaining these events, a determination may be made to see if a dispatch occurred that resulted in some level of latency in execution.

The different illustrative embodiments, however, recognize that this type of approach may require a fair amount or undesirable amount of overhead and processing. Thus, the different illustrative embodiments recognize that an approach is needed to obtain call stack information for threads that have some specified amount of latency in a manner that minimizes the amounts of overhead and processing that occurs.

As a result, the different illustrative embodiments provide a computer implemented method, apparatus, and computer usable program code for obtaining call stack information for threads based on latencies. A set of threads is identified for monitoring. These threads may be those for a particular process or application. Accumulated latency time is monitored for these threads while they execute in the data processing system. In response to a thread in the set of threads having an associated accumulated latency time exceeding a threshold, call stack information is obtained for that thread.

In these examples, an accumulated latency for a thread is the total amount of time that the thread was not executing. The thread may not have been executing for a number of different reasons. These reasons include, for example, without limitation, the thread losing time share on the processor, the thread being idle, the thread waiting for a lock or some resource, or some other reason. This accumulated latency is the amount of latency that has occurred since monitoring started in these examples. In one illustrative embodiment, the call stacks are retrieved when the selected thread or threads are not currently executing when there is an accumulation of latency. In choosing those threads for which call stacks are retrieved, the system may be configured to only get call stacks for threads that are not identified as deamon threads, threads with specific names, threads that are blocked on a specific monitor, or threads that are runnable. The thread states may be queried via operating system support or via Java™ Virtual Machine Tools Interface (JVMTI) support, such as, the Get Thread State function. The information may help identify scalability issues and scalability bottlenecks, such as, locks that have contention and are held for too long. The generated reports may help identify appropriate remedies, such as, changing the code to reduce the granularity of the lock. Latencies that are due to time slice quotas may be used to help identify that value of adding additional resources, such as additional processors.

In some embodiments, the thread states for monitoring and criteria for getting call stacks are managed by the profiler with the profiler waking up periodically and examining the status of the threads maintained by the operating system. In other embodiments, the states and determination to wake up the profiler may be made by the operating system and device driver. Of course, combinations of the two may be used, where information from the profiler is passed to the operating system or device driver.

In providing support for latency monitoring, the operating system or device driver supporting the latency monitoring may keep a list of monitored threads that have been dispatched during a sampling interval. The information about these monitored threads may include the actual execution time on thread and the reason that there is a dispatch away from the thread. When determining whether a latency threshold or other criteria are met to initiate a sample, only those threads in the list need be examined.

Figure 2:
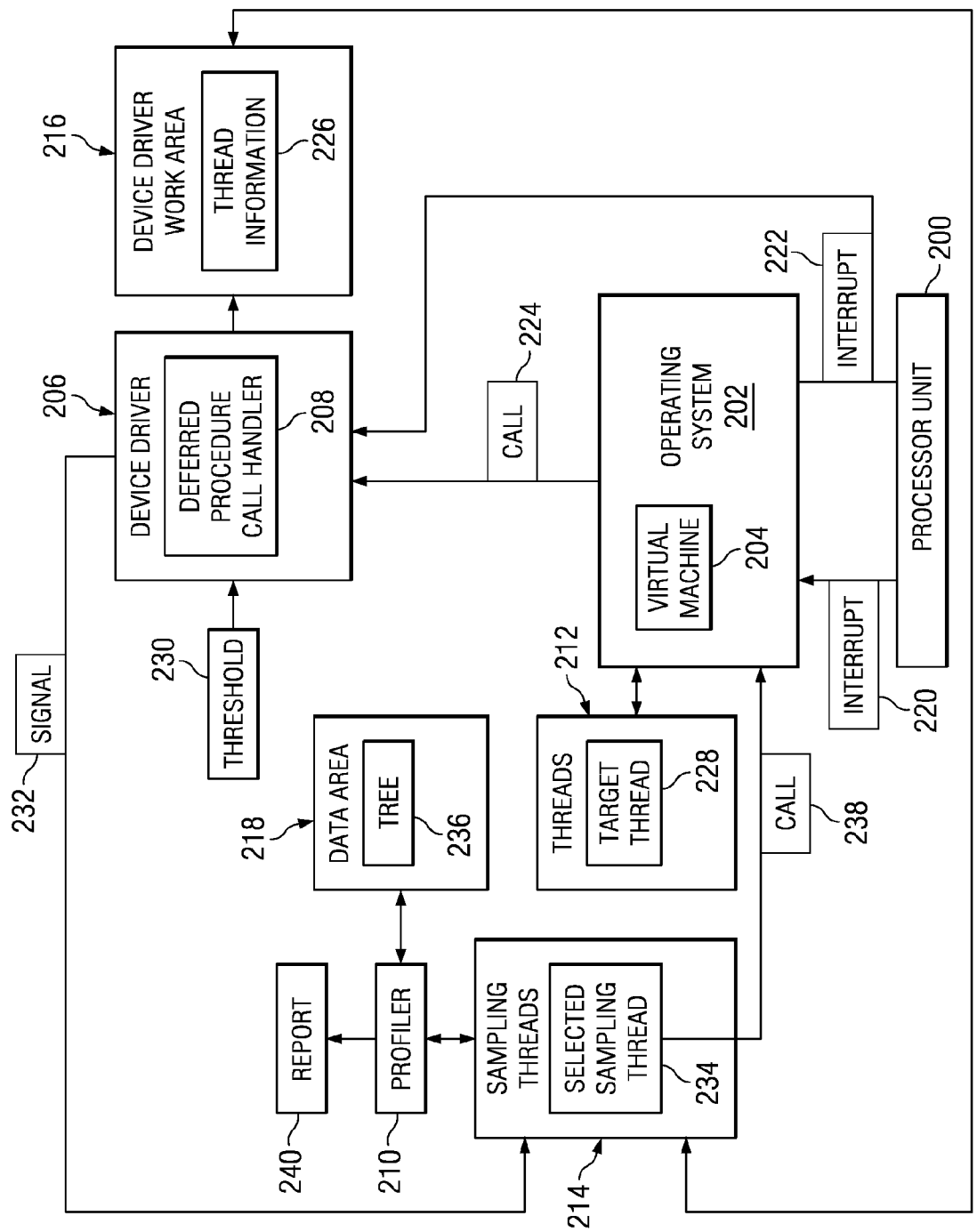
FIG. 2 is a diagram illustrating components used to obtain call stack information in accordance with an illustrative embodiment.

With reference now to FIG. 2, a diagram illustrating components used to obtain call stack information is depicted in accordance with an illustrative embodiment. In this depicted example, the components are examples of hardware and software components found in a data processing system, such as data processing system 100 in FIG. 1. These components include processor unit 200, operating system 202, virtual machine 204, device driver 206, deferred procedure handler 208, profiler 210, threads 212, sampling threads 214, device driver work area 216, and data area 218.

Processor unit 200 is similar to processor unit 104 in FIG. 1 and may generate interrupts, such as interrupts 220 and 222 from a set of processors within processor unit 200. A set, in these examples, refers to one or more items. For example, a set of processors is one or more processors. In another example, a set of threads is one or more threads.

These interrupts may be, for example, without limitation, timer interrupts or counter overflow interrupts. A counter overflow interrupt may occur for any programmed event, such as, when a number of cache misses have occurred. The interrupts may be passed to device driver 206 in a number of different ways.

For example, interrupt 220 is passed to device driver 206 through call 224. Interrupt 222 is passed directly to device driver 206. After receiving this interrupt, device driver 206 may process the interrupt using a deferred procedure call (DPC) to deferred procedure call handler 208 located within device driver 206. Of course, other routines or processes may be used to process these interrupts. The deferred procedure call initiated by device driver 206 is used to continue processing interrupt information from interrupt 222.

When device driver 206 receives interrupt 222, device driver 206 may access thread information 226 in device driver work area 216 to determine whether call stack information should be sampled or obtained. In this illustrative example, device driver 206 accesses device driver work area 216 through a pointer provided to device driver 206 from operating system 202.

In these examples, thread information 226 contains information about a set of threads that have been selected for monitoring. This set of threads may be one or more threads. In these examples, the set of threads is target thread 228. Although only one thread, target thread 228, is present in the set of threads, other embodiments may have multiple threads in the set of threads.

Thread information 226 may include, for example, a process identifier, a thread identifier, a stack pointer, an application instruction address, information relating to thread latency, and other suitable information. Device driver 206 examines this information to determine whether an accumulated latency for a thread in the set of threads has exceeded threshold 230. More than one thread may exceed threshold 230.

Threshold 230 may be, for example, a value in time. Threshold 230 also may be a policy used to obtain a value in determining whether the accumulated latency for a thread has exceeded threshold 230. In these examples, the policy may be a set of rules used to obtain a latency or value. These rules may vary the value depending on the particular environment, and the value may change dynamically as the environment changes. The environment may include, for example, the amount of processor resources being used, the amount of available memory, the number of threads executing, the number of applications executing, the number of processors available in the data processing system, or some other suitable resource or condition.

Depending on the particular implementation, different threads in the set of threads being monitored may have different thresholds. The user may configure profiler 210 to identify thread names and specific thread latency thresholds and or specific thread state criteria to be checked. When threads are created, profiler 210 receives notification, via Java™ virtual machine 204 interfaces in a thread start event. When the thread start event occurs, profiler 210 may determine if the thread is supposed to be monitored for latency and any other criteria and pass this information to device driver 200 or operating system 202.

In one embodiment, the control information is available in a mapped data area and updated directly. An example of a mapped data area is device driver work area 216. In another embodiment, interfaces are defined to identify the thread in threads 212 for monitoring and for the specific threshold for monitoring. In other embodiments, the user may reconfigure the selections depending upon the state of the processing or reports already generated and analyzed.

If device driver 206 determines that call stack information should be obtained for a thread in the set of threads, such as target thread 228, device driver 206 may then initiate the sampling of call stack information for target thread 228. Device driver 206 may initiate this sampling of call stack information by sending signal 232 through sampling threads 214. Signal 232 wakes a sampling thread, such as selected sampling thread 234, to obtain call stack information.

Selected sampling thread 234 may obtain information from thread information 226 in device driver work area 216 and place the information into data area 218. Selected sampling thread 234 may access device driver work area 216 through a pointer passed to this sampling thread in device driver 206. This pointer may be passed as part of signal 232 in these examples.

This information may be placed into tree 236 for later analysis. Further, selected sampling thread 234 may obtain call stack information by sending call 238 to virtual machine 204. Virtual machine 204 may be, for example, a Java™ virtual machine. Of course, virtual machine 204 may take the form of any other type of virtual machine, depending on the particular implementation.

Selected sampling thread 234 takes the call stack information obtained from virtual machine 204 and places this information into tree 236 for analysis. Additionally, tree 236 contains call stack information and other information, such as accumulated latency times, for different threads. Tree 236 also may include information about a leaf node, which was the last routine being executed on that thread at the time the call stack was retrieved.

After call stack information has been collected for the set of threads in which accumulated latency time has exceeded threshold 230, profiler 210 may generate report 240. Report 240 is a presentation of information stored in tree 236.

Figure 3:
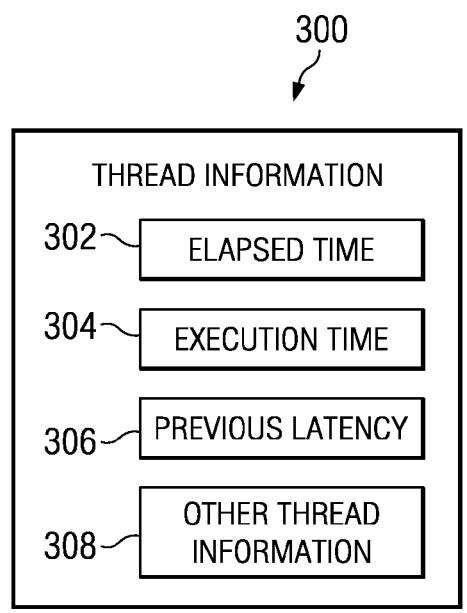
FIG. 3 is a diagram illustrating thread information in a device driver work area in accordance with an illustrative embodiment.

With reference now to FIG. 3, a diagram illustrating thread information in a device driver work area is depicted in accordance with an illustrative embodiment. In this example, thread information 300 is a more detailed example of thread information 226 in FIG. 2. In this example, thread information 300 includes elapsed time 302, execution time 304, previously latency 306, and other thread information 308.

This information is an illustrative example of the type of information that may be stored for each thread being monitored.

Elapsed time 302 is the amount of time that has passed since monitoring of the thread began. Elapsed time 302 may include both idle time and execution time of a thread. In these examples, the amount of time may be measured in a number of different ways. For example, time may be measured in seconds or in cycles.

Next, execution time 304 is the amount of time that the thread has executed. Elapsed time 302 and execution time 304 are values that may be supplied by operating system 202 in FIG. 2.

With elapsed time 302 and execution time 304, the accumulated latency of a thread may be identified. In other words, execution time 304 may be subtracted from elapsed time 302 to identify the accumulated latency for a particular thread.

Previous latency 306 is the accumulated latency that has occurred since the last time a sample has been taken. The difference between the previous latency and the current accumulated latency may be used to identify the difference in latency that has occurred since the last time a sampling thread has been signaled to obtain call stack information. In other words, previous latency 306 is the accumulated latency that was identified the last time call stack information was obtained for the particular thread associated with this latency.

In some embodiments, a ratio between elapsed time 302 and the latency may be used. In those cases, the time of the last sample is also recorded so that the ratio may be determined. This time may be found in other thread information 308. In other embodiments, only latencies between samples may be used to identify threads that have exceeded a specified latency in a specific sample period. In those embodiments, the execution time for all monitored threads may be cleared at the time the sample is processed as part of the algorithm to monitor the threads for a next sample.

Previous latency 306 may be updated with the new or current accumulated latency for the thread of interest. Other thread information 308 may include, for example, a thread monitoring information, such as, the type of thread state criteria, such as, only when being blocked about the thread being monitored. Of course, that can only be supported when the specific state may be determined as the operating system is dispatching from the monitored thread.

Figure 4:
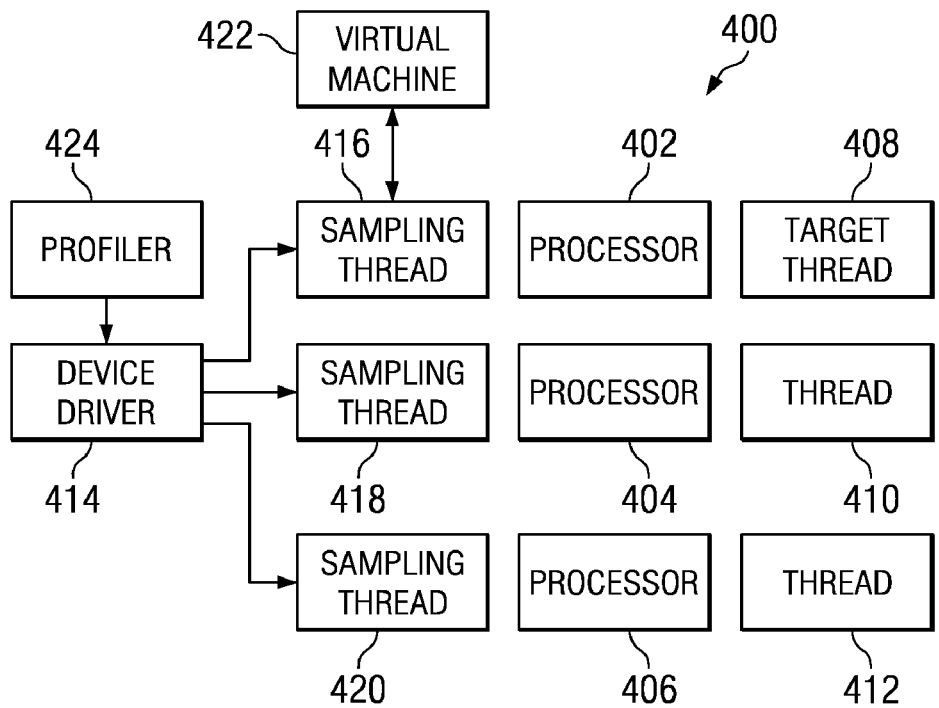
FIG. 4 is a diagram illustrating components used to obtain call stack information in accordance with an illustrative embodiment.

Turning now to FIG. 4, a diagram illustrating components to obtain call stack information is depicted in accordance with an illustrative embodiment. In this example, data processing system 400 includes processors 402, 404, and 406. These processors are examples of processors that may be found in processor unit 200 in FIG. 2. During execution, each of these processors has threads executing on them in the depicted example. In other examples, one or more processors may be in an idle state in which no threads are executing on the processors in an idle state.

When an interrupt occurs, target thread 408 is executing on processor 402; thread 410 is executing on processor 404; and thread 412 is executing on processor 406. In these examples, target thread 408 is the thread interrupted on processor 402. For example, the execution of target thread 408 may be interrupted by a timer interrupt or hardware counter overflow, where the value of the counter is set to overflow after a specified number of events, for example, after 100,000 instructions are completed.

When an interrupt is generated, device driver 414 determines whether to send a signal to a selected sampling thread in sampling threads 416, 418, and 420 based on the accumulated latency for a set of threads being monitored. In one embodiment, only those threads that are not target threads are eligible for being chosen for latency sampling. Each of these sampling threads is associated with one of the processors. Sampling thread 418 is associated with processor 404, sampling thread 420 is associated with processor 406, and sampling thread 416 is associated with processor 402.

One of these sampling threads is woken by device driver 414 when the sampling criteria is met. In these examples, device driver 414 is similar to device driver 206 in FIG. 2. In this example, target thread 408 is the thread of interest for which call stack information is desired.

In the depicted examples, device driver 414 sends a signal to one or more of sampling threads 416, 418, and 420 to obtain call stack information. In this example, sampling thread 416 is woken by device driver 414 to obtain call stack information for target thread 408. If a threshold for accumulated latency has been exceeded by other threads, other sampling threads may be woken to sample call stack information for those threads.

The call stack information may be obtained by making appropriate calls to virtual machine 422. In these examples, virtual machine 422 is a Java™ virtual machine. In these examples, the interface is the Java™ Virtual Machine Tools Interface (JVMTI). This interface allows for the collection of call stack information. The call stacks may be, for example, used to create standard trees containing count usage for different threads or methods. The Java™ virtual machine tool interface is an interface that is available in Java™ 5 software development kit (SDK), version 1.5.0. The Java™ Virtual Machine Profiler Interface (JVMPI) is available in Java™ 2 platform, standard edition (J2SE) SDK version 1.4.2. These two interfaces allow processes or threads to obtain information from the Java™ virtual machine. Descriptions of these interfaces are available from Sun Microsystems, Inc.

Either interface, or any other interface to a Java™ virtual machine, may be used to obtain call stack information for one or more threads in this particular example. Call stack information obtained by sampling thread 416 is provided to profiler 424 for processing.

A call tree is constructed from the call stack obtained from virtual machine 422 at the time of a sample. The call tree may be constructed by monitoring method/functions entries and exits. In these examples, however, tree 500 in FIG. 5 is generated using samples obtained by a sampling thread, such as sampling thread 416 in FIG. 4.

Figure 5:
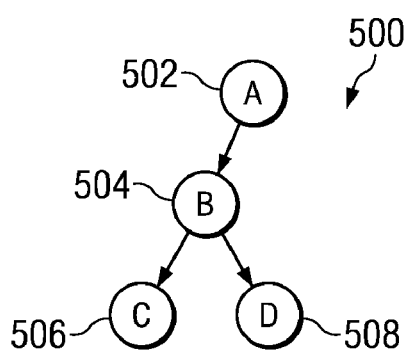
FIG. 5 is a diagram of a tree in accordance with an illustrative embodiment.

Turning to FIG. 5, a diagram of a tree is depicted in accordance with an illustrative embodiment. Tree 500 is a call tree and is an example of tree 236 in FIG. 2. Tree 500 is accessed and modified by an application, such as profiler 210 in FIG. 2. In this depicted example, tree 500 contains nodes 502, 504, 506, and 508. Node 502 represents an entry into method A, node 504 represents an entry into method B, and nodes 506 and 508 represent entries into method C and D respectively. Each of these nodes may include call stack information as well as latency information associated with a particular thread for a method. This latency information includes, for example, elapsed time, execution time, accumulated latency, and difference in latency since the last sampling.

Figure 6:
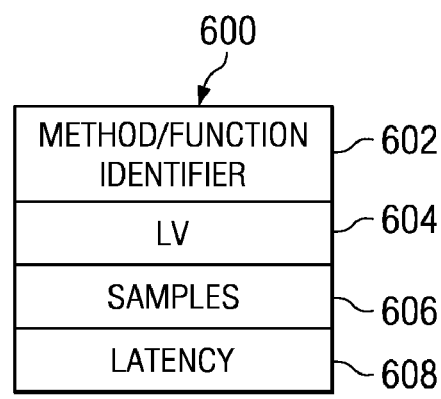
FIG. 6 is a diagram illustrating information in a node in accordance with an illustrative embodiment.

With reference now to FIG. 6, a diagram illustrating information in a node is depicted in accordance with an illustrative embodiment. Entry 600 is an example of information in a node, such as node 502 in FIG. 5. In this example, entry 600 contains method/function identifier 602, tree level (LV) 604, samples 606, and latency 608. Samples 606 also may include counter information collected by the sampling thread. The value of the counter may be added to the count in samples 606 in the leaf node of the tree when a call stack is processed by the profiler. Latency 608 contains latency information that may be obtained from a control block or work area for a device driver. For example, latency 608 may contain latency information for a thread obtained from thread information 226 and device driver work area 216 in FIG. 2.

The information within entry 600 is information that may be determined for a node within a tree. For example, method/function identifier 602 contains the name of the method or function. Tree level (LV) 604 identifies the tree level of the particular node within the tree. For example, with reference back to FIG. 5, if entry 600 is for node 502 in FIG. 5, tree level (LV) 604 would indicate that this node is a root node.

When the profiler is signaled, the profiler may request that a call stack be retrieved for each thread of interest. Each call stack that is retrieved is walked into a call stack tree and each sample or changes to metrics that are provided by the device driver are added to the leaf node's base metrics, which may be the count of samples of occurrences for a specific call stack sequences. In other embodiments, the call stack sequences may simply be recorded.

Latency 608 may include the accumulated latency for the thread sampled. There may be separate categories, such as latency when being blocked or latency during time slices that may also be captured and available as accumulated base metrics. Other information, such as, the number of samples 606 may also be kept.

Figure 7:
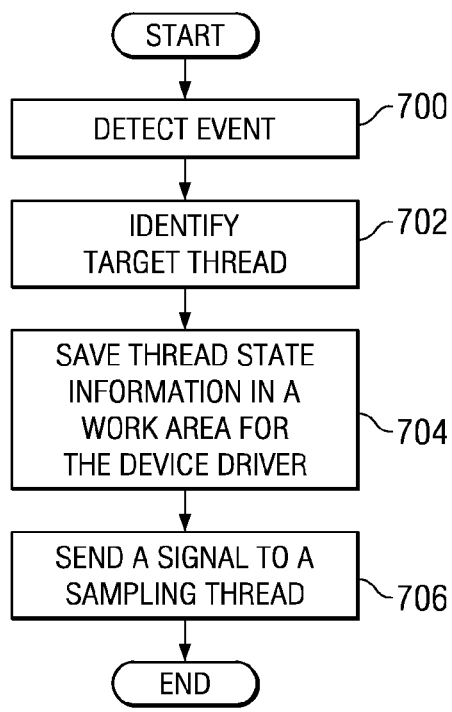
FIG. 7 is a flowchart of a process for initiating the collection of call stack information for a target thread in accordance with an illustrative embodiment.

Turning now to FIG. 7, a flowchart of a process for initiating the collection of call stack information for a target thread is depicted in accordance with an illustrative embodiment. The process illustrated in FIG. 7 may be implemented in a software component, such as device driver 414 in FIG. 4.

The process begins by detecting an event (step 700). In these examples, the event may be a call from an operating system or an interrupt. Next, a target thread is identified (step 702). In step 702, the target thread or threads may be identified by searching the monitored threads for a thread or set of threads whose latency and criteria meet the selection criteria. The interrupted thread, such as the thread that was executing when the interrupt occurred, may be excluded from the list of selected threads.

Thereafter, thread state information for the target thread is saved in a work area for the device driver (step 704). An example of the work area is device driver work area 216 in FIG. 2. Next, a signal is sent to a selected sampling thread (step 706), with the process terminating thereafter. The selected sampling thread may be identified in a number of different ways. For example, the selected sampling thread may be selected as the sampling thread associated with a processor in which the interrupted thread was executed. Of course, other mechanisms also may be used depending on the particular implementation.

In the depicted examples in FIG. 7, the processes execute with respect to a single sampling thread. Depending on the number of threads that exceed a threshold for accumulated latency, more than one target thread may be present. As a result, more than one sampling thread may be signaled to obtain call stack information for the different threads.

Figure 8:
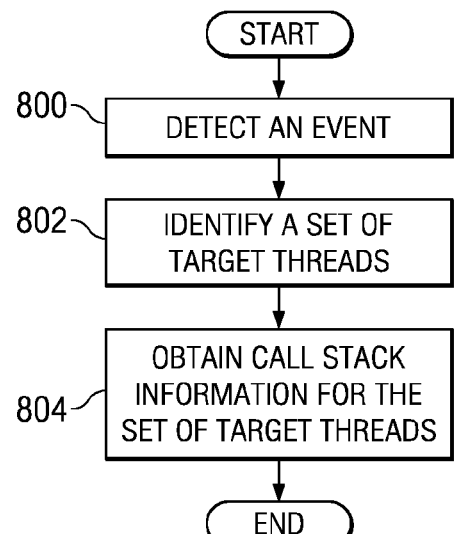
FIG. 8 is a flowchart of a process for initiating the collection of call stack information for a target thread in accordance with an illustrative embodiment.

With reference next to FIG. 8, a flowchart of a process for initiating the collection of call stack information for a target thread is depicted in accordance with an illustrative embodiment. The process illustrated in FIG. 8 may be implemented in a software component, such as profiler 424 in FIG. 4.

The process begins by detecting an event (step 800). This event may be, for example, a timer interrupt in a sampling thread. The process then identifies a set of target threads (step 802). In step 802, the identification may be made by comparing the control block in the profiler containing information related to the last sample, comparing the information available in the device driver regarding the threads, and checking the criteria for identifying the threads to get call stacks. The control blocks may be stored in a data area accessible by the process, such as data area 218 in FIG. 2.

The process then saves the thread state information (step 804). This thread state information may be saved in control blocks by the process. The process may then obtain call stack information for the set of target threads (step 806). The stack information in step 806 may be obtained by sending a call to the Java™ virtual machine. The process terminates thereafter.

Figure 9:
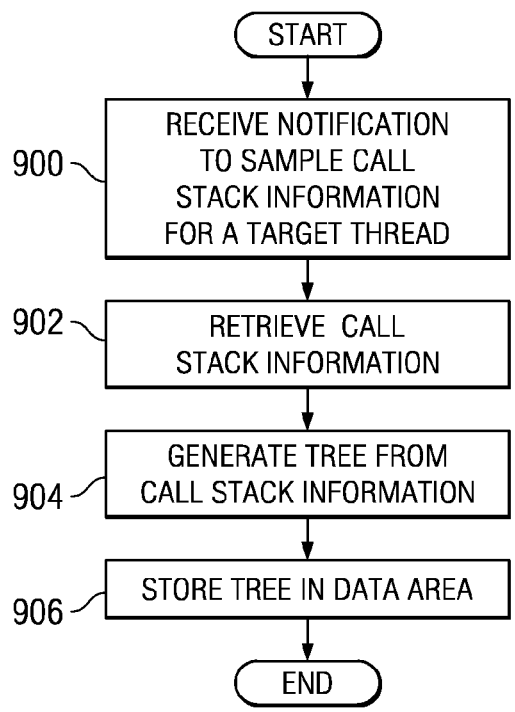
FIG. 9 is a flowchart of a process in a virtual machine for collecting call stack information in accordance with an illustrative embodiment.

Turning next to FIG. 9, a flowchart of a process in a virtual machine for collecting call stack information is depicted in accordance with an illustrative embodiment. The process illustrated in FIG. 9 may be implemented in a virtual machine, such as virtual machine 204 in FIG. 2.

The process begins by receiving a notification to sample call stack information for a target thread (step 900). Call stack information is then retrieved (step 902). Next, a tree is generated from the call stack information (step 904). Tree 500 in FIG. 5 is an example of a tree that may be generated by the sampling thread. Finally, the tree is stored in a data area (step 906), with the process terminating thereafter. In these examples, the tree is stored in a data area, such as data area 218 in FIG. 2.

Figure 10:
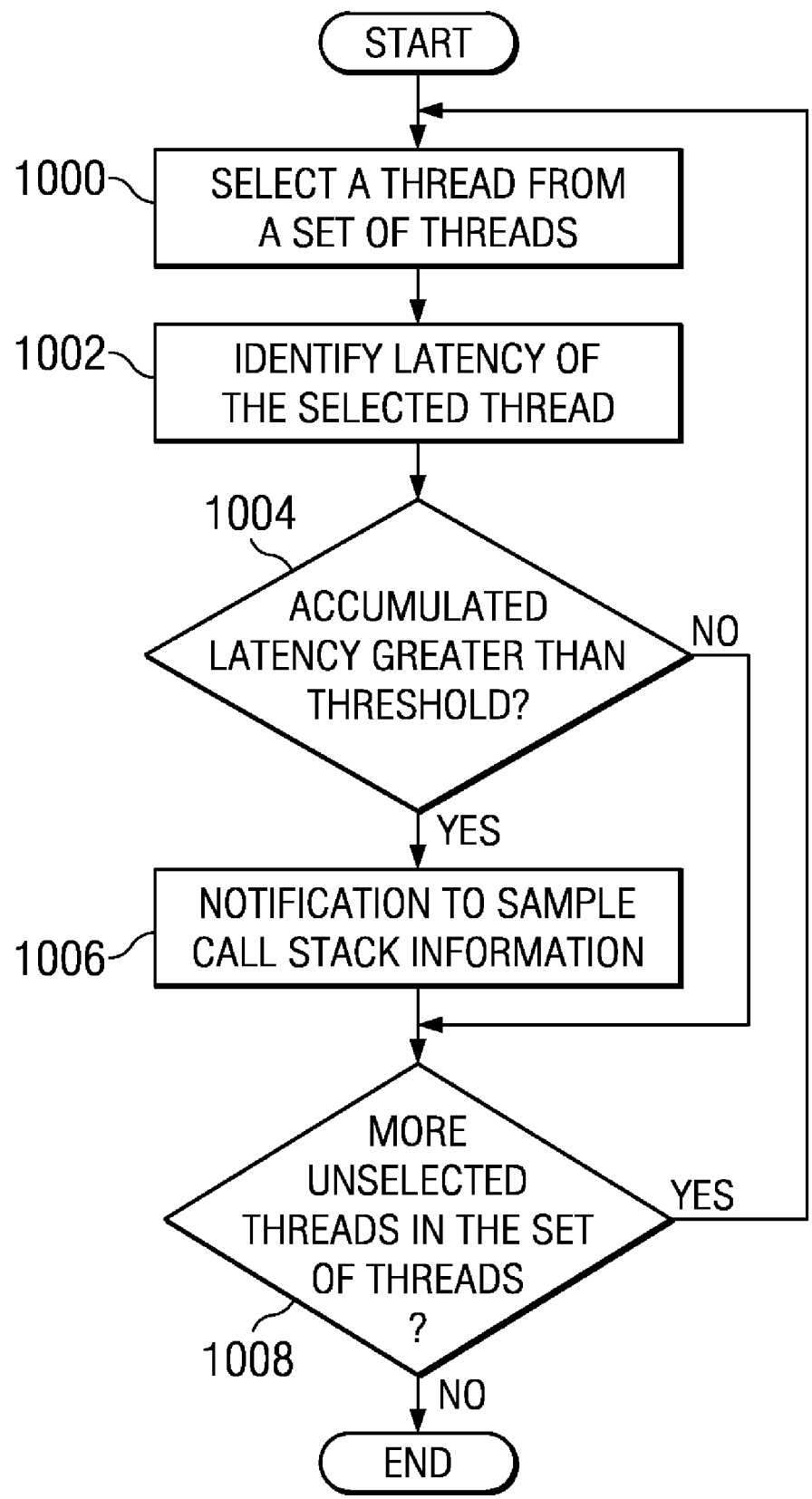
FIG. 10 is a flowchart of a process for initiating the sampling of call stack information by a device driver in accordance with an illustrative embodiment.

With reference now to FIG. 10, a flowchart of a process for initiating the sampling of call stack information by a device driver is depicted in accordance with an illustrative embodiment. The process illustrated in FIG. 10 may be implemented in a device driver, such as device driver 414 in FIG. 4. This process is used by a device driver to check a set of threads of interest to determine whether a threshold for any threads in the set has been exceeded. If the threshold has been exceeded, the device driver initiates a process to obtain the call stack information for that thread.

The process begins by selecting a thread from a set of threads (step 1000). The latency of the selected thread is identified (step 1002). In these examples, the latency may be determined by subtracting the execution time from the elapsed time. A determination is made as to whether the accumulated latency for the thread is greater than the threshold (step 1004). This determination may be made by comparing the accumulated latency to a selected value. The selected values may be identified to the profiler via command line options or via interfaces or dynamically be a socket interface where the end user has identified the threads and the thresholds. This value may be a static value that is the same for all of the threads. This threshold may vary depending on the particular thread and environment. Further, the threshold also may vary dynamically as the environment changes.

If the accumulated latency is greater than the threshold, a notification is sent to sample call stack information (step 1006). The notification is to obtain call stack information for the selected thread having the accumulated latency greater than the threshold. In these examples, the call stack sampling is performed by sending a signal to a sampling thread as described above.

Next, a determination is made as to whether more unselected threads are present in the set of threads for processing (step 1008). If additional unselected threads are present, the process returns to step 1000 as described above. Otherwise the process terminates.

With reference again to step 1004, if the accumulated latency for the thread is not greater than the threshold, the process proceeds directly to step 1008 as described above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Thus, the different illustrative embodiments provide a computer implemented method, apparatus, and computer usable program code for sampling call stack information. In the different illustrative embodiments, the accumulated latency time for a set of threads executing on the data processing system is monitored. In response to one or more threads in the set of threads having associated accumulated latency time exceeding the threshold, call stack information is obtained for those threads.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of sampling call stack information, the computer implemented method comprising:
   monitoring an accumulated latency time for each thread in a set of threads while executing in a data processing system;
   responsive to a thread in the set of threads having an associated accumulated latency exceeding a threshold, obtaining the call stack information for the thread, wherein the call stack information includes for each thread elapsed time, execution time, and previous latency; and
   constructing a call tree from the call stack information by monitoring method and function entries and exits, wherein the call tree includes nodes comprising call stack information and latency information associated with a particular thread for a method or a function.

2. The computer implemented method of claim 1, wherein the obtaining step comprises:
   responsive to the thread in the set of threads having the associated accumulated latency exceeding the threshold, sending a signal to a profiler to initiate sampling of the call stack information.

3. The computer implemented method of claim 1, wherein the obtaining step further comprises:
   waking a sampling thread, of a profiler, to obtain sample call stack information.

4. The computer implemented method of claim 1, wherein the threshold is selected from one of a value and a ratio of a value.

5. The computer implemented method of claim 1, wherein the threshold is based on a current operating environment and changes as the current operating environment changes.

6. The computer implemented method of claim 1, wherein the monitoring step comprises:
   responsive to an interrupt, identifying a current accumulated latency for each thread in the set of threads; and
   comparing the accumulated latency for the each thread in the set of threads to the threshold.

7. The computer implemented method of claim 1, wherein the monitoring step is performed by a device driver.

8. The computer implemented method of claim 1, wherein the call stack information is obtained using a virtual machine interface to collect the call stack information.

9. A data processing system comprising:
   a bus;
   a communications unit connected to the bus;
   a storage device connected to the bus, wherein the storage device includes program code; and
   a processor unit connected to the bus, wherein the processor unit executes the program code to monitor an accumulated latency time for each thread in a set of threads while executing in a data processing system; obtain call stack information for the thread in response to a thread in the set of threads having an associated accumulated latency exceeding a threshold, wherein the call stack information includes for each thread elapsed time, execution time, and previous latency; and construct a call tree from the call stack information by monitoring method and function entries and exits, wherein the call tree includes nodes comprising call stack information and latency information associated with a particular thread for a method or a function.

10. The data processing system of claim 9, wherein in executing the program code to obtain the call stack information for the thread in response to the thread in the set of threads having the associated accumulated latency exceeding the threshold, the processor executes the program code to send a signal to a profiler to initiate sampling of the call stack information in response to the thread in the set of threads having the associated accumulated latency exceeding the threshold.

11. The data processing system of claim 9, wherein in executing the program code to obtain the call stack information for the thread in response to the thread in the set of threads having the associated accumulated latency exceeding the threshold, the processor unit further executes the program code to wake a sampling thread, by a profiler, to obtain sample call stack information.

12. The data processing system of claim 9, wherein the threshold is selected from one of a value and a ratio of values.

13. The data processing system of claim 9, wherein the threshold is based on a current operating environment and changes as the current operating environment changes.

14. The data processing system of claim 9, wherein in executing the program code to monitor the accumulated latency time for the set of threads executing in the data processing system, the processor executes the program code to identify a current accumulated latency for each thread in the set of threads in response to an interrupt; and compare the total latency for the each thread in the set of threads to the threshold.

15. The data processing system of claim 9, wherein the call stack information is obtained using a virtual machine interface to collect the call stack information.

16. A computer program product for sampling call stack information, the computer program product comprising:
a computer recordable storage media;
program code, stored on the computer recordable media, for monitoring an accumulated latency time for each thread in a set of threads while executing in a data processing system; and
program code, stored on the computer recordable media, responsive to a thread in the set of threads having an associated accumulated latency exceeding a threshold, for obtaining the call stack information for the thread wherein the call stack information includes for each thread elapsed time, execution time, and previous latency; and program code, stored on the computer recordable media, for constructing a call tree from the call stack information by monitoring method and function entries and exits, wherein the call tree includes nodes comprising call stack information and latency information associated with a particular thread for a method or function.

17. The computer program product of claim 16, wherein the program code, stored on the computer recordable media, responsive to the thread in the set of threads having the associated accumulated latency exceeding the threshold, for obtaining the call stack information for the thread comprises:
program code, stored on the computer recordable media, responsive to the thread in the set of threads having the associated accumulated latency exceeding the threshold, for sending a signal to a profiler to initiate sampling of the call stack information.

18. The computer program product of claim 16, wherein the program code, stored on the computer recordable media, responsive to the thread in the set of threads having the associated accumulated latency exceeding the threshold, for obtaining the call stack information for the thread further comprises:
program code, stored on the computer readable media, for waking a sampling thread, by the profiler, to obtain sample call stack information.

19. The computer program product of claim 16, wherein the threshold is selected from one of a value and a ratio of values.

20. The computer program product of claim 16, wherein the threshold is based on a current operating environment and changes as the current operating environment changes.

21. The computer program product of claim 16, wherein the program code, stored on the computer recordable media, for monitoring the accumulated latency time for the set of threads executing in the data processing system comprises:
program code, stored on the computer recordable media, responsive to an interrupt, for identifying a current accumulated latency for each thread in the set of threads; and
program code, stored on the computer recordable media, for comparing the total latency for the each thread in the set of threads to the threshold.

22. The computer program product of claim 16, wherein the program code, stored on the computer recordable media, for monitoring the accumulated latency time for the set of threads executing in a data processing system is program code for a device driver.

23. The computer program product of claim 16, wherein the call stack information is obtained using a virtual machine interface to collect the call stack information.

* * * * *